US006269405B1

(12) United States Patent
Dutcher et al.

(10) Patent No.: US 6,269,405 B1
(45) Date of Patent: Jul. 31, 2001

(54) USER ACCOUNT ESTABLISHMENT AND SYNCHRONIZATION IN HETEROGENEOUS NETWORKS

(75) Inventors: David Paul Dutcher, Austin; William H. Sinclair, Jr., Round Rock; Stanley Alan Smith, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/175,048

(22) Filed: Oct. 19, 1998

(51) Int. Cl.[7] ................................................. G06F 15/16
(52) U.S. Cl. .......................................... 709/248; 707/201
(58) Field of Search .................................... 380/25; 707/9, 707/201, 204; 713/200, 201, 202; 709/223, 226, 229, 248

(56) References Cited

U.S. PATENT DOCUMENTS

| | | |
|---|---|---|
| 5,418,854 | 5/1995 | Kaufman et al. . |
| 5,671,354 | 9/1997 | Ito et al. . |
| 5,694,595 * | 12/1997 | Jacobs et al. ............................. 707/9 |
| 5,708,812 * | 1/1998 | Dyke et al. ......................... 707/9 X |
| 5,719,941 * | 2/1998 | Swift et al. ............................. 380/25 |
| 5,768,519 | 6/1998 | Swift et al. . |
| 5,774,551 | 6/1998 | Wu et al. . |
| 5,819,020 * | 10/1998 | Beeler, Jr. ......................... 707/204 X |
| 5,832,211 * | 11/1998 | Blakley, III et al. ................. 713/202 |
| 6,044,465 * | 3/2000 | Dutcher et al. ....................... 713/200 |
| 6,065,054 * | 5/2000 | Dutcher et al. ....................... 709/226 |
| 6,070,244 * | 5/2000 | Orchier et al. .................... 709/223 X |

OTHER PUBLICATIONS

Author unknown, Syntegration Inc. UserMan for NT, http://www.syntegration.com/userman.html, Syntegration, Inc, Jan. 1998, 2 pages.*

Nancy McLain, NetVision: Using NDS as a Metadirectory to Synchtonize Different Directories, Novell Research, Jun. 1998, 1 page.*

Bob Gordon, Computer Associates Introduces Advanced Cross–Platform Directory Management Solution, http://www.cai.com/press/98apr/directit_solution.html, Apr. 1998, 1 page.*

Dr. Magnus Harlander, Central System Administration in a Heterogeneous Unix Environment: GeNUAdmin, 1994 LISA, Sep. 1994, pp. 1–8.*

* cited by examiner

*Primary Examiner*—Zarni Maung
*Assistant Examiner*—Patrice Winder
(74) *Attorney, Agent, or Firm*—Duke W. Yee; Jeffrey S. LaBaw

(57) ABSTRACT

A method for creating and updating user accounts at a central server that provides for establishment and synchronization of associated user accounts at a heterogeneous network of managed servers based on the user account information of the central server. This enables the network to consist of a heterogeneous set of servers that are executing with the same operating system or subsystem as the central server, and servers that are executing with a different operating system or subsystem as the central server. The updates to the user accounts on the managed servers are synchronized automatically without systems administrator or user intervention. Updates to the user account are based on central server information and can include password changes, initial resource access or other user account attributes.

17 Claims, 8 Drawing Sheets

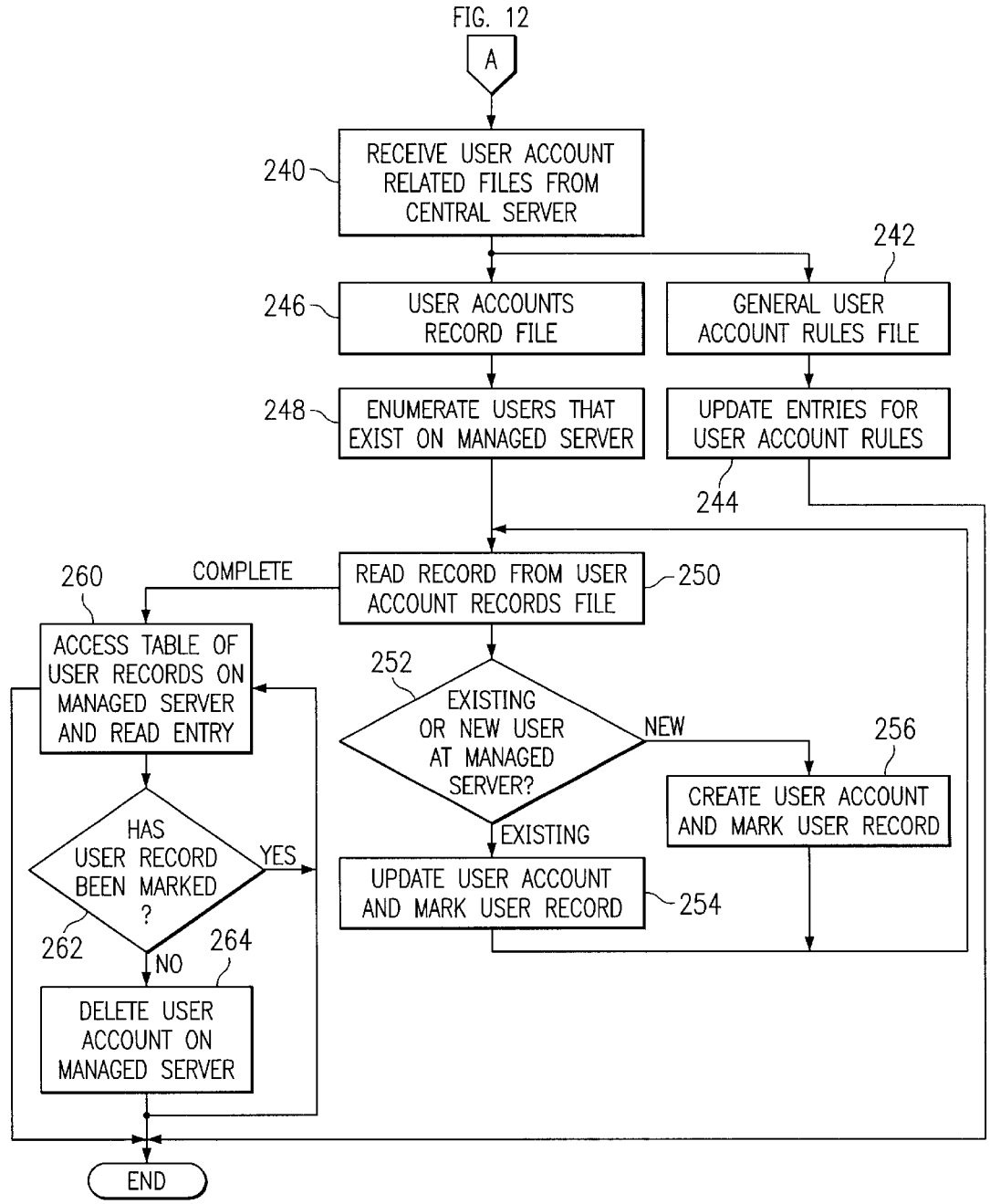

USER ACCOUNT ESTABLISHMENT AND SYNCHRONIZATION IN HETEROGENEOUS NETWORKS

BACKGROUND OF THE INVENTION

1. Technical Field

The present invention relates generally to computer networks and more particularly to the establishment and synchronization of user accounts within a server network which consists of a central server and a set of managed servers running native and non-native operating systems for the establishment and synchronization of user accounts within a heterogeneous server network.

2. Description of the Related Art

The client-server model of computing is a well-known environment. In the model, the user of a computer utilizes a "client" system. The client system runs any of a number of computer operating systems to manage the basic functions that users execute (such as accessing files, executing programs, system administration and the like) as well as to serve as the base against which programs are written. Well-known client operating systems include Microsoft Windows 3.1, Windows for Workgroups, Windows 95, Windows 98, IBM® OS/2® Warp, Apple Macintosh, DOS, many variations of UNIX, and Microsoft Windows NT. The client system serves as the users workstation, and it may execute programs as well as store some user data.

The server system can also run any of a number of computer operating systems. Well-known server operating systems include Novell Netware, IBM OS/2 Warp Server, IBM AS/400®, Microsoft Windows NT, and many variations of OSF UNIX. The server system is accessed by the client system for specific functions. The functions include, but are not limited to, storage and retrieval of data, storage and execution of applications, and storage of and access to user information.

Server networks are increasingly becoming heterogeneous due to differing problems that can be solved by different servers. User management in these environments requires the creation of different user accounts on the different types of servers. These user accounts eventually have different passwords and possibly different user I.D.'s. A mechanism is needed to allow a single user account definition to be used as the basis for any additional user accounts that exist in the network. The mechanism needs to go beyond current technology options and allow the accounts on all servers to be continuously updated.

A common term used to refer to a network of related servers is a domain. Within the server domain is a central server acting as the primary domain controller and a plurality of "managed" servers sometimes called secondary servers. Industry standards have been developed (for critical and common functions) to aid in the access from different types of client systems to different types of server systems. The use of these standards on the client and server afford users the opportunity to carry out functions in a consistent manner on a variety of common client and server operating systems. One of the activities that has been standardized is the "authentication" of users. Authentication refers to the process in which a user is validated as being able to complete a log-on and/or access a system. Standard protocols have been defined within the X/Open Server Message Block (SMB) specification and the Open Systems Foundation (OSF) Distributed Computing Environment (DCE) specification.

While many products and operating systems have been developed that utilize the standard protocols, not all products have used the standards. When this occurs, either additional work must be done by the other operating system to implement the unique commands used by a vendor, or access to the other new system and/or product is not allowed if the unique commands are not made available to other vendors. When the commands and/or protocol are not made available, that aspect of the system and/or product is sometimes characterized as being "closed". In regard to user management and authentication, the Microsoft Windows NT operating system is an example of a closed server system that is used in many enterprise computer networks.

Protocols have also been developed to allow servers to communicate between systems. These protocols have not been standardized to the extent that client to server protocols have been. As a result, homogeneous server networks (all servers running a common operating system or subsystem) have developed solutions for functions like user account management across systems. Solutions for user account management across heterogeneous server networks (servers running different operating systems or subsystems), were previously unknown.

The present invention addresses the problem where creation or update of user accounts at a central server (primary domain controller) provides for establishment and synchronization at managed servers (secondary domain servers) of the user account information based on the central server information. The present invention enables the network to consist of servers that are executing with the same operating system or subsystem as the central server and servers that are executing with a different operating system or subsystem as the central server. Updates to the user account can include password changes, initial resource access or other user account attributes. The updates are synchronized automatically without system administrator or user intervention.

SUMMARY OF THE INVENTION

It is a general object of this invention to provide user account establishment on a central server.

It is a more specific object to provide establishment and synchronization from a central server to a plurality of managed servers in a heterogeneous environment within the server domain.

Still another object is to uncouple the proprietary linkage between servers in a known "closed" architecture to enable users to obtain and access account information in heterogeneous server networks.

A still further object of this invention is to allow an IBM OS/2 server to establish and synchronize user accounts with a Windows NT managed server.

These and other objects, features and advantages are provided by a method of establishing and synchronizing a user account in heterogeneous networks which allows a single user account from one type of server to be used as a basis to create a corresponding user account on a different type of server. After establishment of a user account, the server where the initial account was established will ensure that all account updates, such as password changes, are replicated on the other servers in the environment on a real time basis. By doing this as a core function of the server, account changes can be appropriated immediately without the requirement of human interaction at the server.

In a preferred embodiment, the initial establishment of a user account is in an IBM OS/2 Warp Server domain which is then used as a base to create and manage a corresponding user account on a Microsoft Windows NT server. An advantage of this invention is that a heterogeneous server environment made up of servers running multiple diverse operating systems can be continuously kept up-to-date without any human interactions. By doing an account creation update on a continual real time basis, systems are kept synchronized at all times and it is done as a core service versus being done on an ad hoc or scheduled basis.

BRIEF DESCRIPTION OF THE DRAWINGS

For a more complete understanding of the present invention and the advantages thereof, reference should be made to the following detailed description taken in connection with the accompanying drawings in which:

FIG. 13 is a flow chart illustrating full synchronization in a server domain.

DETAILED DESCRIPTION OF THE PREFERRED EMBODIMENT

The invention may be run on a variety of computers or collection of computers under a number of different operating systems. The computer could be, for example, a personal computer, a mini computer, mainframe computer or a computer running in a distributed network of other computers. Although the specific choice of computer is limited only by disk and disk storage requirements, computers in the IBM PS/2 (TM) series of computers could be used in the present invention. One operating system which an IBM PS/2 personal computer may run is IBM's OS/2 2.0 (TM).

In the alternative, the computer system might be in the IBM RISC System/6000 (TM) line of computers which run on the AIX (TM) operating system. The various models of the RISC System/6000 is described in many publications of the IBM Corporation. The AIX operation system is described in other publications of the IBM Corporation.

Figure 1:
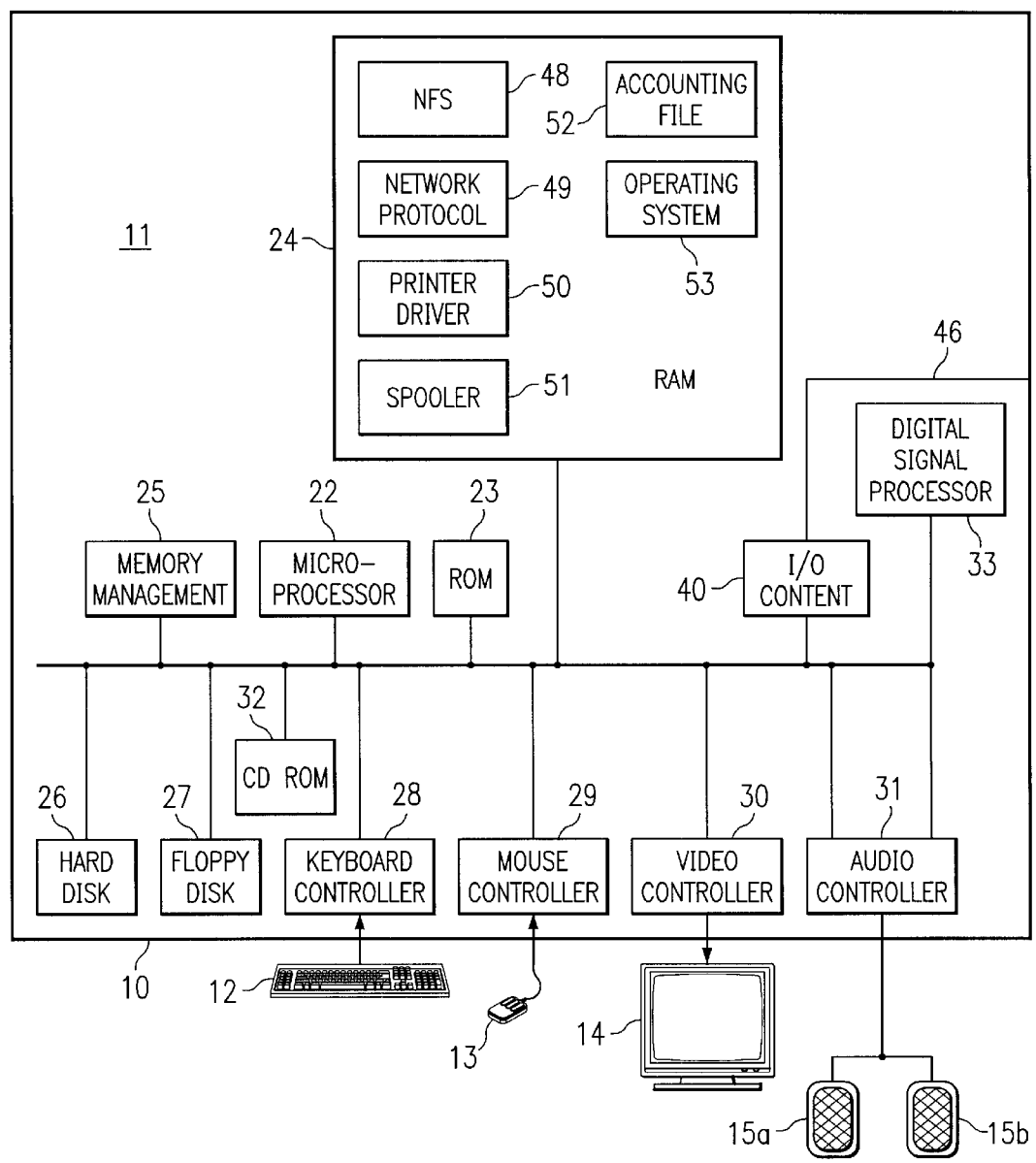
FIG. 1 depicts a computer system configured according to the teachings of the present invention.

While various computers in the computer networks can be used on the computer network by a client-server setup, FIG. 1 is a common computer interface to the computer network wherein a computer 10 comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PC series of computers is one of the Intel family of microprocessors including the 386,486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM may be used. Other RISC chips made by Hewlett Packard, Sun, Motorola and others may be used in the specific computer.

The ROM 23 contains, among other codes, the Basic Input-Output System (BIOS) which controls basic hardware operations such as the interaction of the processor and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD-ROM 32 also coupled to the system bus 21 is used to store a large amount of data, e.g., a multimedia program or presentation.

Also connected to this system bus 21 are various I/O controllers: the keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

As described above, one of the preferred implementations of the invention is as sets of instructions 48–52 resident in the random access memory 24 of one or more computer systems configured generally as described above. Until required by the computer system, the set of instructions may be stored in another computer readable memory, for example, in the hard disk drive 26, or in a removable memory such as an optical disk for eventual use in the CD-ROM 32 or in a floppy disk for eventual use in the floppy disk drive 27. Further, the set of instructions can be stored in the memory of another computer and transmitted in a transmission medium over a local area network or a wide area network such as the Internet when desired by the user. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements.

Figure 2:
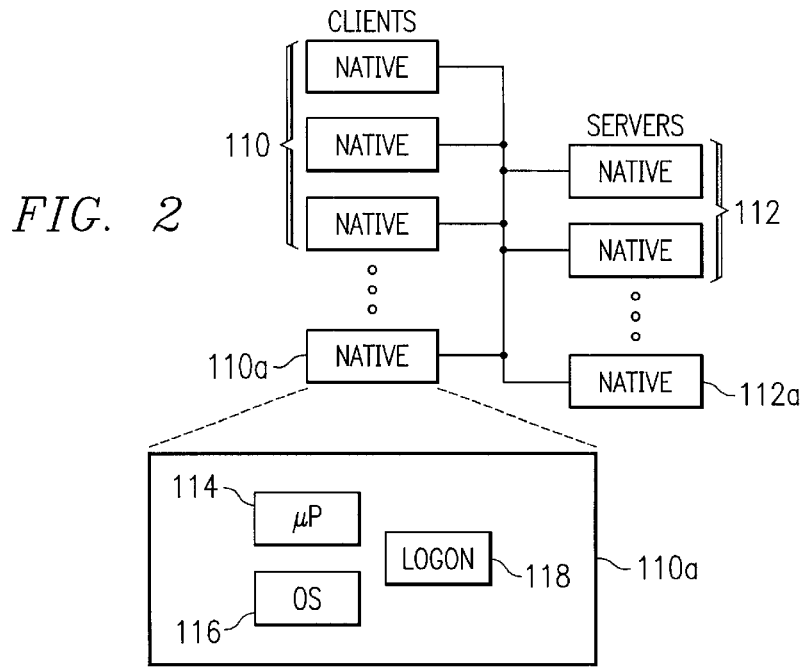
FIG. 2 is a block diagram of a representative computer network in which the present invention is implemented.

Further, the invention is often described in terms that could be associated with a human operator. While the operations performed may be in response to user input, no action by a human operator is desirable in any of the operations described herein which form part of the present invention;

FIG. 2 illustrates a computer network having one or more "client" machines 110 and one or more "servers" 112. A typical client machine 110a is a personal computer or workstation running an Intel processor 114 and the Microsoft Windows NT 4.0 operating system 116. For convenience herein, a machine configured in this manner is sometimes referred to as a "Windows NT client". Any other type of hardware platform that runs Windows NT operating system may be used as the client. According to the present invention, the client also includes an application 118, which provides certain additional functionality to achieve the objects of the present invention. Each client has basic networking hardware to establish a connection out to a server. Thus, for example, a client may have a TCP/IP or NETBIOS connection to the network running over a token ring or Ethernet adapter.

Typically, a server in the computer network is another personal computer or workstation platform that is Intel, Power PC® or RISC® based, and includes an operating system such as Windows NT 4.0, IBM® OS/2® Warp Server, A/X®) or the like. At least one server 112a in the computer network is the central server and executes the base operating system or subsystem which is termed "native". This "native" system could be an IBM OS/2 Warp Server, which is sometimes referred to as a "Warp Server". A server 112 is said to be "native" if it is running the same operating system as the server 112a. A "non-native" server is thus a server platform (e.g., a personal computer) running an operating system or subsystem that is different than the operating system running on the server system 112a. Given an IBM OS/2 Warp Server as 112a, examples of such "non-native" servers include, without limitation, Microsoft Windows NT Server, Novell Netware Server, other types of server Message Block (SMB) servers, as well as operating systems that run Open Systems Foundation (OSF) Distributed Computing Environment (DCE) software. An example of the latter is a DCE Cell running Distributed File System (DFS).

Figure 3:
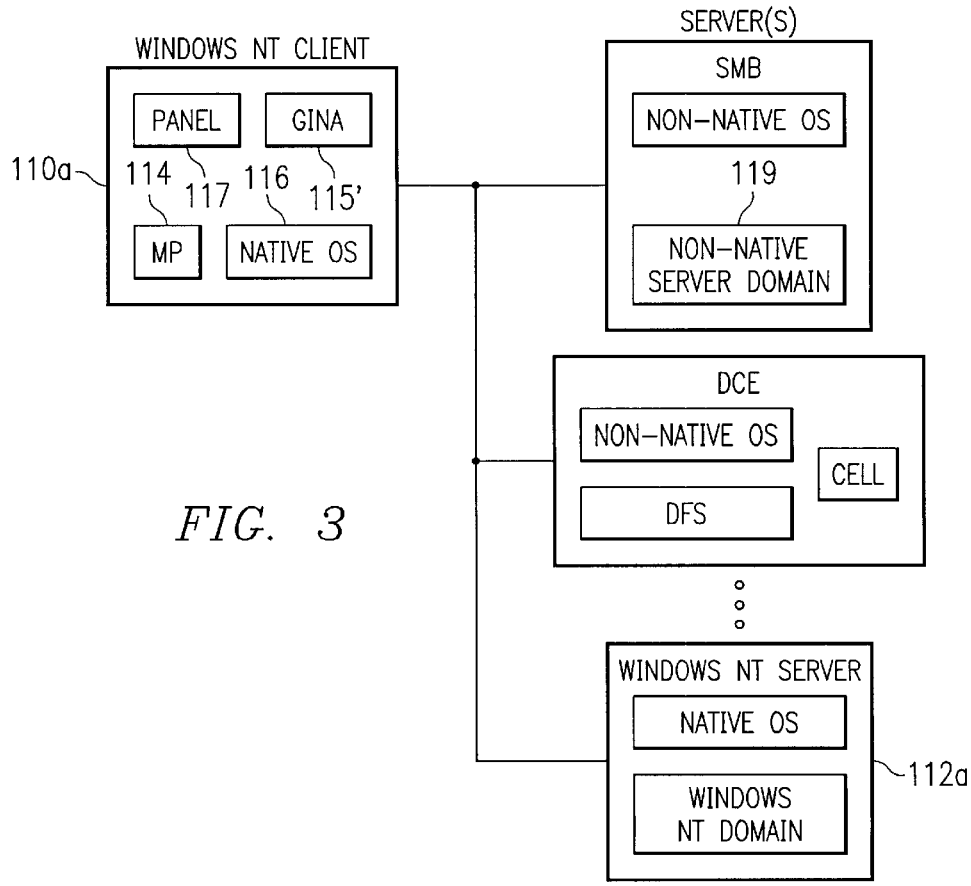
FIG. 3 is a block diagram of the present invention wherein a log-on mechanism is provided in the client running a native operating system to facilitate authentication of a user of the client machine against an account held at a heterogeneous server domain.

In the prior art, a mechanism exists to allow a user at client system 110a to authenticate to a server domain using a user account held at that domain. As seen in FIG. 3, the module GINA 115' ("graphical identification and authorization") is registered on the example Windows NT client. This enables the Windows NT client user to be authenticated against an account held at a native or non-native server domain 119. As used herein, a "non-native server domain" refers to a database of user account information retained at a given server running an operating system that is different than the operating system running at the client system. The term "heterogeneous client-server network" is commonly used to describe an environment in which the client operating system and server operating system are different. This type of environment is common in the client-server model. In contrast, the term "homogenous client-server network" is commonly used to describe an environment in which the client operating system and server operating system are the same.

A non-native server domain is typically supported on a non-native server. Thus, where the user seeks authentication from a Windows NT client, a non-native server domain includes, without limitation, any Server Message Block (SMB) server domain (e.g., IBM Warp Server 4.0), a DCE Cell in which Distributed File System (DFS) is implemented, or other known domains such as UNIX domains. This is illustrated in FIG. 3. Of course, the computer network can also include a Windows NT server domain 112a if authentication is sought from a native server domain.

While "heterogeneous client-server networks" and "homogeneous client-server network" are part of the environment for this invention, they are not specific to it. This invention is specific to the network of servers. In particular, it refers to a "server network" consisting of a central server and a set of managed servers. The managed servers can be native to the central server or non-native to the central server.

In the described embodiment, the central server is an IBM OS/2 Warp Server managing a heterogeneous mix of OS/2 servers and Windows NT servers. One of ordinary skill in the art should appreciate that teachings of this invention are also applicable where the server is running other types, native or non-native servers within the server domain. The present invention allows a single user account from one type of server to be used as the basis to create the corresponding user account on different type of server. After establishment of the user account, the server where the initial account was established will ensure all account updates are replicated to the other server environment on a real time basis.

Figure 4:
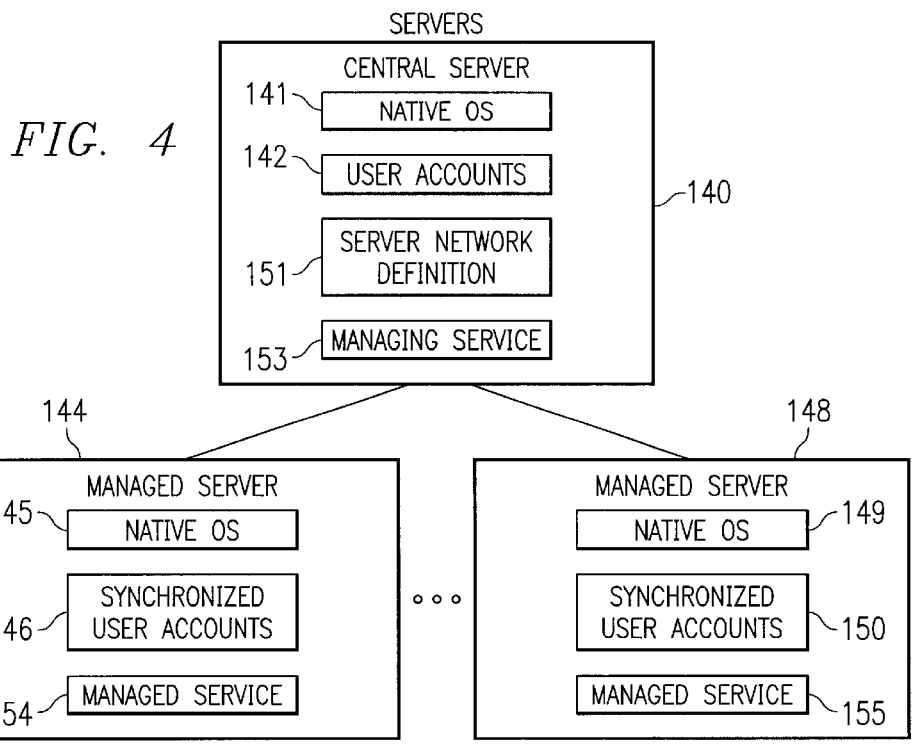
FIG. 4 is a block diagram of a homogeneous network of servers.

FIG. 4 is a block diagram representing a high level operation of the present domain server network having a central server 140 with a native operating system 141, user accounts 142, server network definition 151 and managing service 153. Central server 140 controls homogeneous managed servers 144 and 148. Within managed server 144 is a native operating system 145, synchronized user accounts 146 and managed service 154. Likewise managed server 148 has a native operating system 148, synchronized user accounts 150 and managed service 155. The central server 140 can manage a multiplicity of servers such as servers 144 and 148 having a native OS operating system and synchronized user accounts and managed service.

The server network is defined in the central server by server network definition 151. The server network definition 151 provides the network definition required to link the servers together. It consists of a table of "addresses" that are used to direct and receive communications between specific servers in a network. Whether a broadcast mechanism like NETBIOS or a more directed mechanism like TCP/IP is used for communication, the appropriate network addresses would be included in the table. One skilled in the art would recognize that portions or all of the server network definition could be stored at the managed server(s) and/or the central server.

Similarly the managing service 153 is used to control a managed service 154 within managed server 144 and 148. The managing service 153 and managed services 154 and 155 provide the mechanism to synchronize user accounts.

Managing service 153 and managed service(s) 154 and 155 are the core components used to manage the user accounts across the servers. In a "homogeneous server network" where the servers utilize the same native operating system, the services are implemented through usage of common support that exists on each server. In addition, user accounts 142 and synchronized user accounts 146 are commonly created, updated, and deleted while containing the same information in each.

Prior art exists for user account synchronization in the "homogeneous server network". User account management commands are sent between the central server 140 and the managed server(s) 144 and 148. Since the same commands (application programming interfaces) exist on both servers in a "homogeneous server network", the services are there to support the remote command execution between servers. An example of this is an IBM OS/2 Warp Server created as a Primary Domain Controller which would be a central server and an IBM OS/2 Warp Server created as an additional server which would be a managed server.

Figure 5:
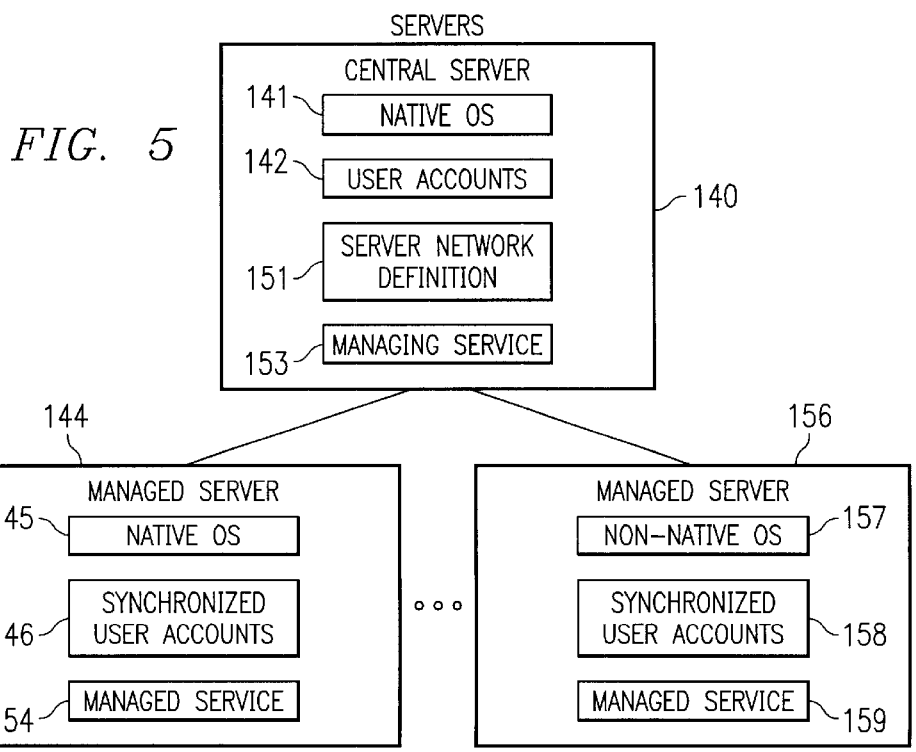
FIG. 5 is a block diagram of a heterogeneous server domain having a plurality of managed servers.

Shown in FIG. 5, central server 140 having a required operating system 141, user accounts defined in 142, a server network definition 151 and a managing service 153. The central server 140 now manages a managed server 144 having a native operating system 145, synchronized user accounts 146, and a managed service 154, as well as heterogeneous server 156 having a non-native operating system 157, synchronized user accounts 158 and a managed service 159. In the described embodiment, the native operating system is an IBM OS/2 Warp Server and the non-native operating system is a Microsoft Windows NT server.

Similar to the "homogeneous server network", managing service 153 and managed service(s) 154 and 159 are the core components used to manage the user accounts across the servers in the "heterogeneous server network". In a "heterogeneous server network" where the servers utilize native OS such as 145 and non-native OS such as 157, common support does not exist on each server. With no common support guaranteed between the central server and the managed server(s), a new and unique mechanism is required to enable the establishment and synchronization of user accounts between the unlike servers.

Managing service 153 and managed service 159 represent the situation where the servers are different with one using a native OS and one using a non-native OS. Managing service 153 is responsible for determining what each managed server requires and delivering it in a format that can be used at the managed server 156. This involves the tracking of user account changes, packaging of the changes in a known format, and sending them to the correct managed server when required. In the described embodiment, the central server 140 is an IBM OS/2 Warp Server and the user account changes are packaged in the same format as used to synchronize to a managed server 144 that is also an IBM OS/2 Warp Server.

Managed service 159 is responsible for implementation of support to maintain communication with central server 140. The service receives the account changes, determines what has been changed with the user account, and implements the correct set of application programming interface calls to effect the changes for the synchronized user accounts 158 on the managed server 156. The mechanism to do this will be different for each non-native OS and is detailed in later figures.

Figure 6:
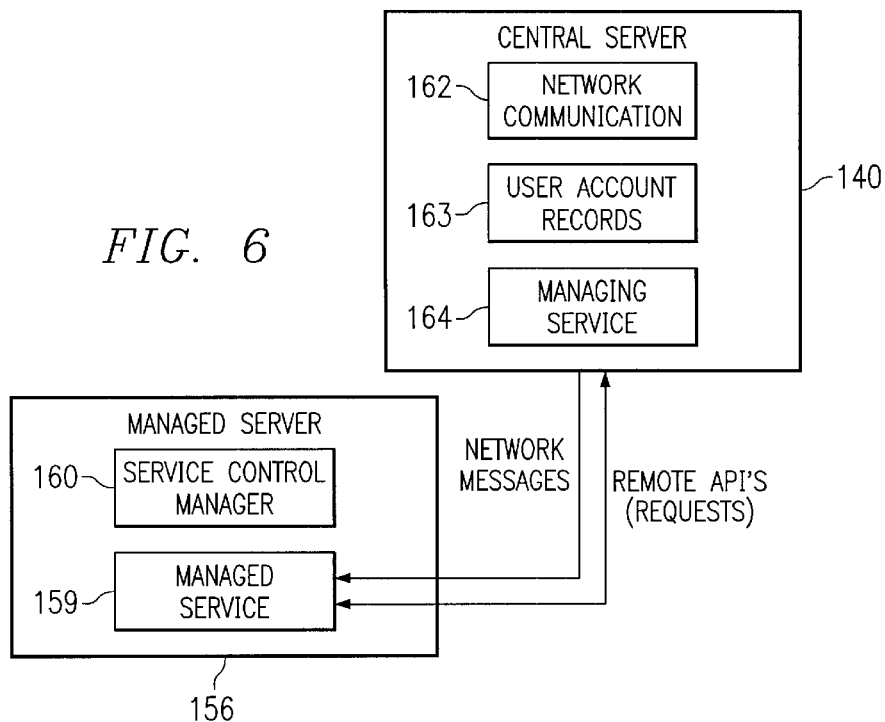
FIG. 6 is a block diagram of a central server managing data flow.

In operation, central server 140 sends information called network messages to the network from a network communication mechanism 162, as shown in FIG. 6, to the managed server 156, while also responding to requests received from managed servers in the network. Through the network, network messages are used to provide requests and responses to the managed service 159 within the managed server 156. A user account subsystem containing a database of records is maintained in user account records 163. Also resident in the central server 140 is the managing service 164 that was described in detail as mechanism 153 in FIG. 5. Central server 140 and managed server 156 make specific functional requests through application programming interfaces (API) which specify requests and responses as described in FIG. 5.

To enable the receipt and processing of requests sent from the central server, a mechanism is required to start the managed service on the managed server. Once started, the managed service continuously awaits status updates and requests. Shown in FIG. 7, a service control manager is required on the managed server. Either when the managed server is started or through a request for a user with administrative capabilities, the managed service is started in step 182. Following the starting of the service, settings that control the operation of the service are initialized in step 183. These settings are described in FIG. 12. To allow the service to respond to commands issued by the administrator, a mechanism must be established. In step 184, a thread in the operating system is launched to allow the service to recover commands as shown in step 185. Commands include the changing of settings, stopping the service, and starting the service.

Figure 7:
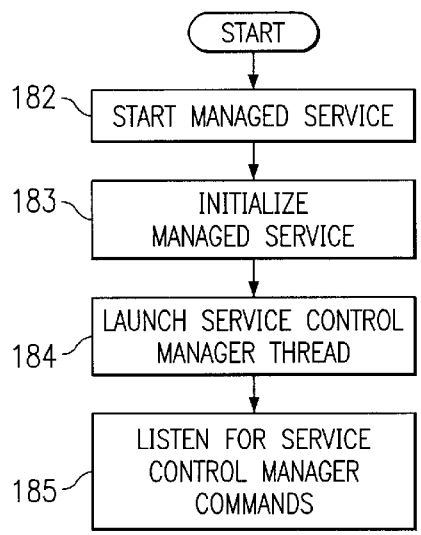
FIG. 7 is a flow chart of the managed service start up.
Figure 8:
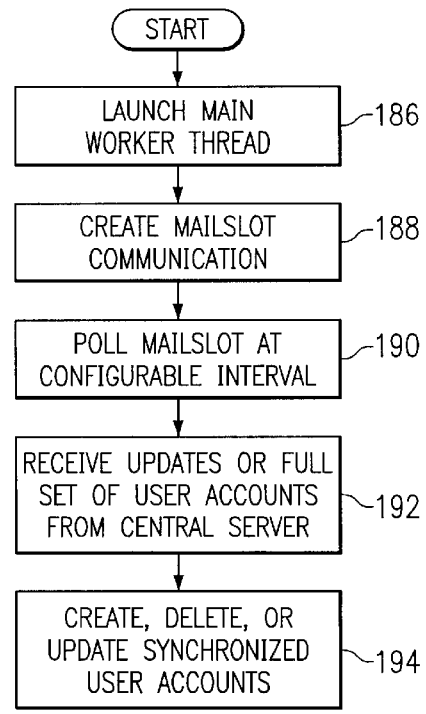
FIG. 8 is a flow chart illustrating managed service operations.

At the same time that the service control manager thread is launched in step 184 of FIG. 7, the main operational support must also be started on the managed server. FIG. 8 shows the steps to establish operational support. A thread or equivalent mechanism is started on the managed server as in step 186. A mailslot or similar communication mechanism is then established at the server in step 188 to enable communication with the central server. To monitor status from the central server, the mailslot or similar communication mechanism must be checked on a regular interval. Step 190 includes the process of checking on a regular basis. For each server in the heterogeneous server network, the communication support must be implemented as appropriate for the non-native OS. Steps 192 and 194 introduce the receipt and processing of user account requests from the central server. The main worker thread shown in step 186 is used to execute those steps which are detailed in FIG. 12 and FIG. 13, and are implemented for each heterogeneous network server.

Figure 9:
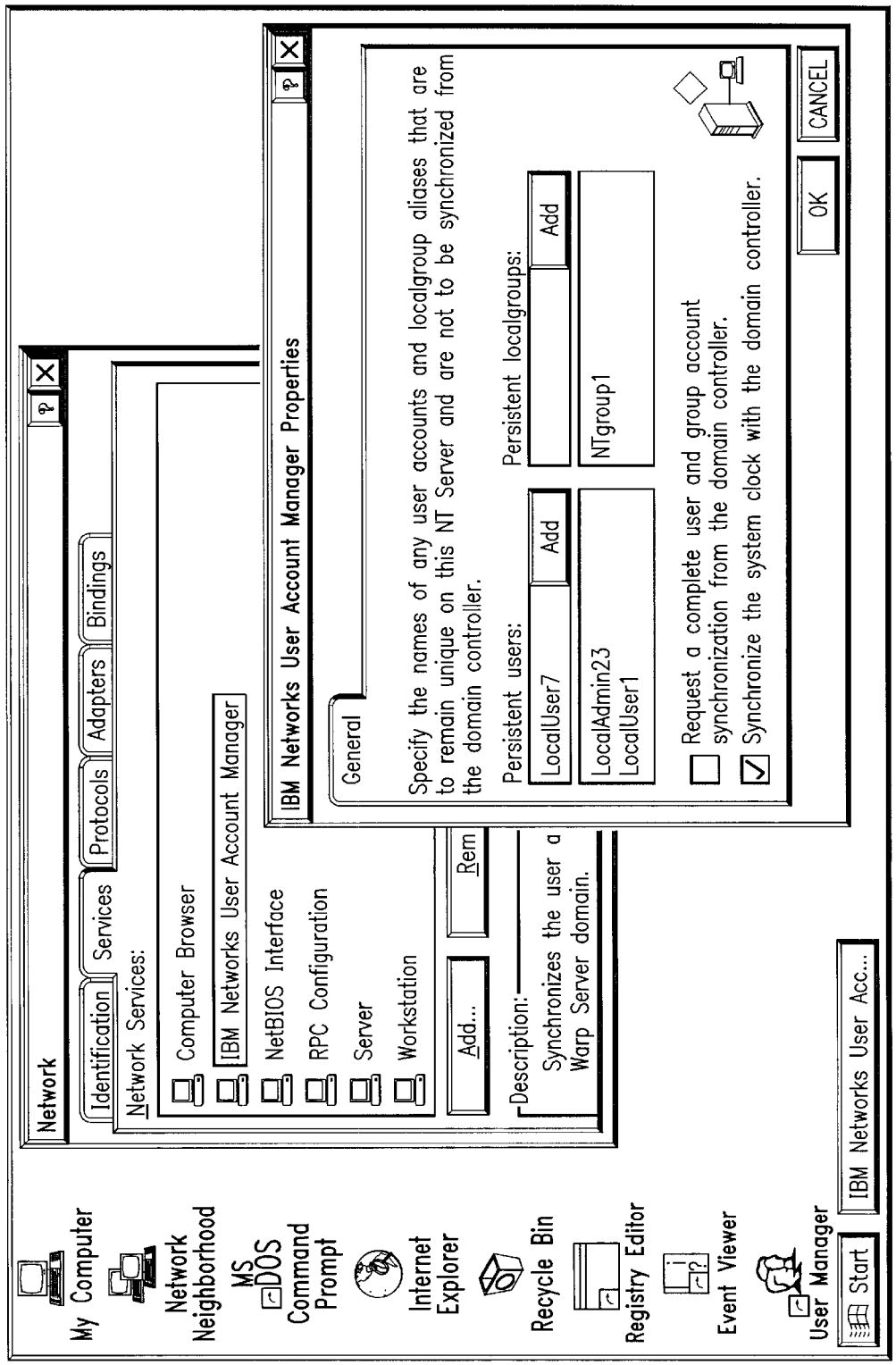
FIG. 9 is a representation of the general properties display screen used to manage services.
Figure 10:
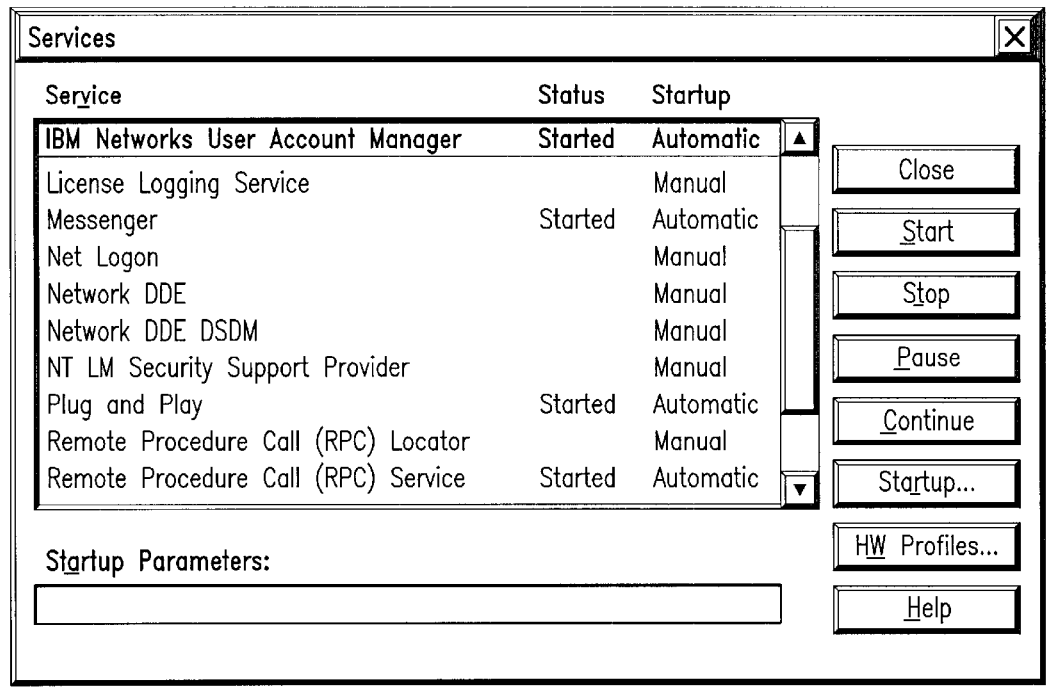
FIG. 10 is a screen representation of the managed server definition on a managed server.

The establishment of the managed service at the network server can be through local administration as shown in the screen printout of the managed service screen shot shown in FIG. 9 and FIG. 10. To define the service which must be active to enable the ongoing synchronization of user accounts, the service is installed on the server that is to be managed. The method and display of the service may differ by the type of heterogeneous server in the network, and FIG. 9 shows the service in the described embodiment of a Microsoft Windows NT server as a managed server. Communication between a central server and the managed servers is required. In FIG. 9 the managed service which is called "IBM Networks User Account Manager", is established as part of the Network portion of the server. Additional settings can be established through properties associated with the managed service. Synchronization of the clock on the managed server with the central server clock is one of the settings that is made.

FIG. 10 shows additional controls used for the managed service on the managed server. For synchronization of user accounts to be in effect, the managed service must be active. In FIG. 10, the screen shot of the screen used by the administrator to control the service is shown. The method to start can either be manual or automatic. The status of the service should also be able to be retrieved to allow the administrator to know whether synchronization is active. The status column in FIG. 10 is an example of a status display.

Figure 11:
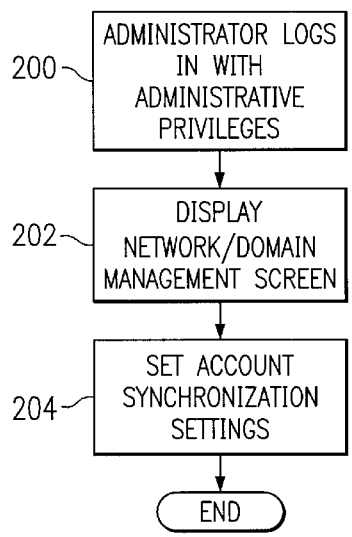
FIG. 11 is a flow chart illustrating the setting of central server synchronization values.

To establish and control the managing service on the central server, the server must be accessed with administrative privilege as shown in step 200 of FIG. 11. The managing service needs to exist on the server and in the case of the described embodiment of the central server being in IBM OS/2 Warp Server, it is the LAN manager service used for homogeneous servers. Step 202 shows the access to the settings that control operation of the managing service. The actual settings are done in step 204. Settings that are needed include the interval that status updates (described as pulses) are exchanged from the central server to the managed server(s), and how much difference is allowed between the servers. The combination of these settings determine how frequently updates occur to synchronize the user accounts between servers.

Figure 12:
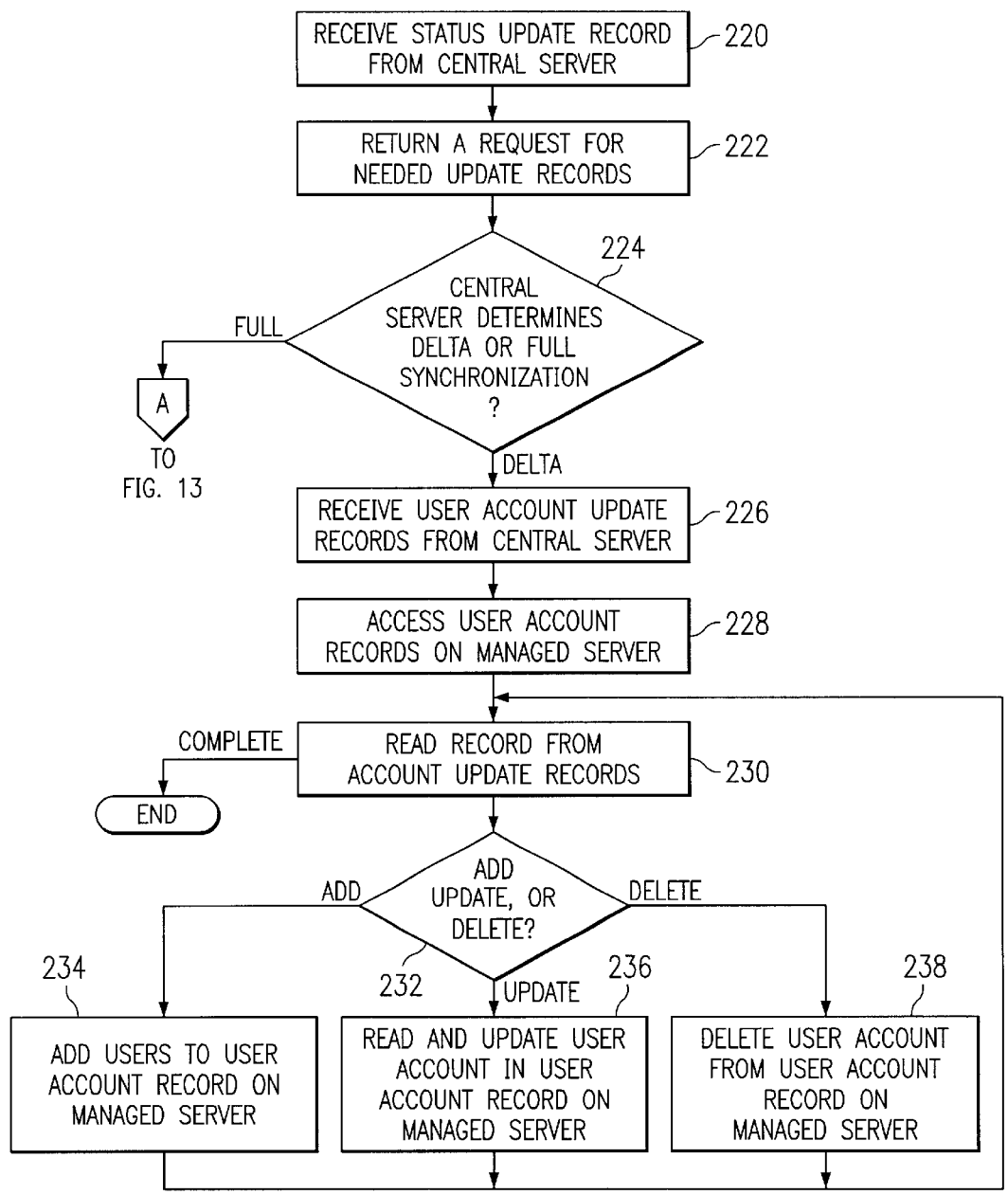
FIG. 12 is a flow chart illustrating user account establishment and synchronization.

To establish user accounts and provide for synchronization, the managed server receives a status update record from the central server in step 220 as shown in FIG. 12. A return request for needed update records is next made in step 222. The central server determines whether a delta update should be done since the last update or if a full synchronization needs to be made in step 224. The determination should be based on the number of records that will be required to synchronize the managed server. If the number of updates is large, it should be determined that a full synchronization will be done. If only an incremental or delta update needs to be made, the managed server receives a user account update record from the central server as per step 226. Since the format and method to access user accounts differs for each type of server, the managed service is responsible for the API calls to access the user account records and read the records. Access to the user account records on the managed server is then made in step 228. This is done by the server when it determines account updates are required. The record is read from account update records in step 230 by the service using API's that exist on the heterogeneous server.

Once this is done, the managed service makes the determination in step 232 to add, update or delete the user account. If the request is to add, the service is responsible for issuing the appropriate API call on the managed server to add the user to the user account database on as shown in step 234. If the request is to update, step 236 is executed and the service issues the appropriate API call on the managed server causing the user account to be read and updated on the managed server. If the request is to delete, step 238 is executed and the service issues the appropriate API call to cause the user account to be deleted from the user account database on the managed server. This operation continues until the read record from account update records step 230 is complete which occurs when all records have been processed.

If the central server determines a full synchronization is requested on the managed server due to the amount of updates required in step 224 of FIG. 12, the steps of FIG. 13 are required. Full synchronization of the system is shown in FIG. 13 wherein the managed server receives the user account related files from the central server in step 240.

To address settings like password contents and length along with user account contents and length, the central server will send a general user accounts rules update file as shown in step 242. This file will be processed by the managed service and the appropriate API calls for the managed server will be issued to update to settings controlling this in step 244. These settings may differ by type or server and the managed service must make the correct calls.

The managed service is responsible for receiving the user account records file at step 246 that contains all user accounts on the central server.

To enable a comparison between the user account records sent from the central server in step 246 and the user account records that currently exist on the managed server, the managed service must issue the appropriate API call to enumerate all users as shown in step 248. To process each of the user account records sent from the central server, step 250 shows each record being read by the managed service. A comparison is made at step 252 by the managed service to determine if the user account record represents an existing account on the managed server or whether it is a new account.

If the managed service determines the user account record is for an existing user on the managed server, the service will issue to appropriate API call causing the user account on the managed server to be updated at step 254. In addition, the user account should be marked for later processing. If the record is for a new user on the managed server, the service issues the appropriate API call for the managed server causing a user account to be created in step 256 on the managed server using information provided in the record sent from the central server. In addition, the user account should be marked for later processing. This continues until the read record user account file at step 250 is complete which occurs when all central server records have been processed.

After all record from the central server have been processed in step 250, the table of user records on the managed server is accessed in step 260. Each entry in the table is read. If the record has been marked, which indicates it was either updated at step 254 or newly created in step 256, processing returns to step 260 and the user account is retained on the managed server. If the user record has not been marked, then the user no longer exists on the central server. The managed service is then responsible for issuing the appropriate API call on the managed server to cause the user account to be deleted in step 264 and processing continues with the next record is read at step 260. After all accounts in the table have been processed, the full synchronization is completed.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Though two managed servers were shown and described, a multiplicity of managed servers may be controlled by a central server. Therefore, changes in form and detail may be made therein without departing from the spirit and scope of the invention as set forth in the accompanying claims.

What is claimed is:

1. A method for synchronizing user account information across a heterogeneous server network, comprising the steps of:

establishing a base user account on a central server running a native operating system for a user;

establishing a set of managed servers running a non-native operating system in which user account information is kept for the user;

collecting a set of completed changes made to the user account information on the central server; and automatically updating the collective user account information on the set of managed servers according to the set of completed changes so that the collective user account information on the managed servers is made the same as the user account information on the central server.

2. The method as recited in claim 1, wherein the central server is running IBM OS/2 as the native operating system.

3. The method of claim 2, wherein the managed servers are running Windows NT as the non-native operating system.

4. The method as recited in claim 1, wherein the central server is running Windows NT as the native operating system.

5. The method of claim 4, wherein the managed servers are running IBM OS/2 as the non-native operating system.

6. The method as recited in claim 1, wherein the managed servers are running IBM OS/2 as the non-native operating system.

7. The method as recited in claim 1, wherein the managed servers are running Windows NT as the non-native operating system.

8. A computer program product in a computer readable medium for synchronizing user account information across a heterogeneous server network, the computer program product comprising:

means for establishing a base user account on a central server for a user;

means for establishing a set of managed servers in which user account information is kept for the user;

means for collecting a set of completed changes made to the user account information on the central server; and means for automatically updating the collective user account information on the set of managed servers according to the set of completed changes so that the collective user account information on the managed servers is made the same as the user account information on the central server.

9. The computer program product as recited in claim 8, wherein the central server is running IBM OS/2 as a native operating system.

10. The computer program product as recited in claim 9, wherein the managed servers are running Windows NT as a non-native operating system.

11. The computer program product as recited in claim 8, wherein the central server is running Windows NT operating system.

12. The computer program product as recited in claim 11, wherein the managed servers are running IBM OS/2 as a non-native operating system.

13. A computer connectable to a computer network, the computer comprising:

a processor;

a central server running a native operating system on the processor;

a mechanism for synchronizing user account information, comprising:

means for establishing a base user account on a central server for a user;

means for establishing a set of managed servers running a non-native operating system in which user account information is kept for the user;

means for collecting a set of completed chances made to the user account information on the central server; and means for automatically updating thc collective user account information on the set of managed servers according to the set of completed changes so that the collective user account information on the managed servers is made the same as the user account information on the central server.

14. The computer as recited in claim 3, wherein the central server is running IBM OS/2 as a native operating system.

15. The computer as recited in claim 14, wherein the non-native operating system is Windows NT.

16. The computer as recited in claim 13, wherein the central server is running Windows NT as a native operating system.

17. The computer as recited in claim 16, wherein the non-native operating system is IBM OS/2.

\* \* \* \* \*

UNITED STATES PATENT AND TRADEMARK OFFICE
CERTIFICATE OF CORRECTION

PATENT NO. : 6,269,405 B1
DATED : July 31, 2001
INVENTOR(S) : Dutcher et al.

It is certified that error appears in the above-identified patent and that said Letters Patent is hereby corrected as shown below:

Column 2,
Line 43, "domain" should be -- networks --.

Column 9,
Line 34, after "database", delete "on".

Column 12,
Line 19, "chances" should be -- changes --.

Signed and Sealed this

Sixteenth Day of July, 2002

Attest:

JAMES E. ROGAN
Attesting Officer    Director of the United States Patent and Trademark Office